(12) United States Patent
Bendure et al.

(10) Patent No.: US 7,357,451 B2
(45) Date of Patent: Apr. 15, 2008

(54) SWIVELABLE CAR SEAT

(76) Inventors: Connie S. Bendure, 5825 Garth Cir., NW., Canton, OH (US) 44718; Augustine M. Mastroine, 5825 Garth Cir., NW., Canton, OH (US) 44718; William A. Talerico, 5908 Westshore Dr., NW., Canton, OH (US) 44718

( * ) Notice: Subject to any disclaimer, the term of this patent is extended or adjusted under 35 U.S.C. 154(b) by 0 days.

(21) Appl. No.: 11/364,976

(22) Filed: Mar. 1, 2006

(65) Prior Publication Data
US 2006/0197364 A1 Sep. 7, 2006

Related U.S. Application Data

(60) Provisional application No. 60/657,951, filed on Mar. 2, 2005.

(51) Int. Cl.
*A47D 1/10* (2006.01)
(52) U.S. Cl. .................................................. 297/256.12
(58) Field of Classification Search ............ 297/256.12
See application file for complete search history.

(56) References Cited

U.S. PATENT DOCUMENTS

| | | | |
|---|---|---|---|
| 4,762,364 A | 8/1988 | Young | |
| 4,936,629 A | 6/1990 | Young | |
| 4,971,392 A | 11/1990 | Young | |
| 5,183,312 A | 2/1993 | Nania | |
| 5,660,430 A * | 8/1997 | Clarke | 297/256.12 X |
| 5,971,479 A | 10/1999 | Jacquemot et al. | |
| 6,158,807 A | 12/2000 | Hampton | |
| 6,196,629 B1 * | 3/2001 | Onishi et al. | 297/256.12 |
| 6,241,314 B1 | 6/2001 | Pufall | |
| 6,260,920 B1 * | 7/2001 | Tolfsen | 297/256.12 X |
| 6,431,647 B2 | 8/2002 | Yamazaki | |
| 6,520,579 B2 * | 2/2003 | Kassai et al. | 297/256.12 |
| 6,572,189 B1 | 6/2003 | Blaymore | |
| 6,793,283 B1 | 9/2004 | Sipos | |
| 7,073,859 B1 * | 7/2006 | Wilson | 297/256.12 X |

* cited by examiner

*Primary Examiner*—Rodney B. White
(74) *Attorney, Agent, or Firm*—Buckingham, Doolittle & Burroughs, LLP; Edward T. Kennedy

(57) ABSTRACT

A car seat for restraining a child during operation of a motor vehicle includes a base capable of being removably disposed on a selected motor vehicle seat. A seat unit is swivelably connected to said base. A locking assembly selectively extends between the base and the seat unit for selectively restricting the swiveling of the seat unit on the base.

12 Claims, 5 Drawing Sheets

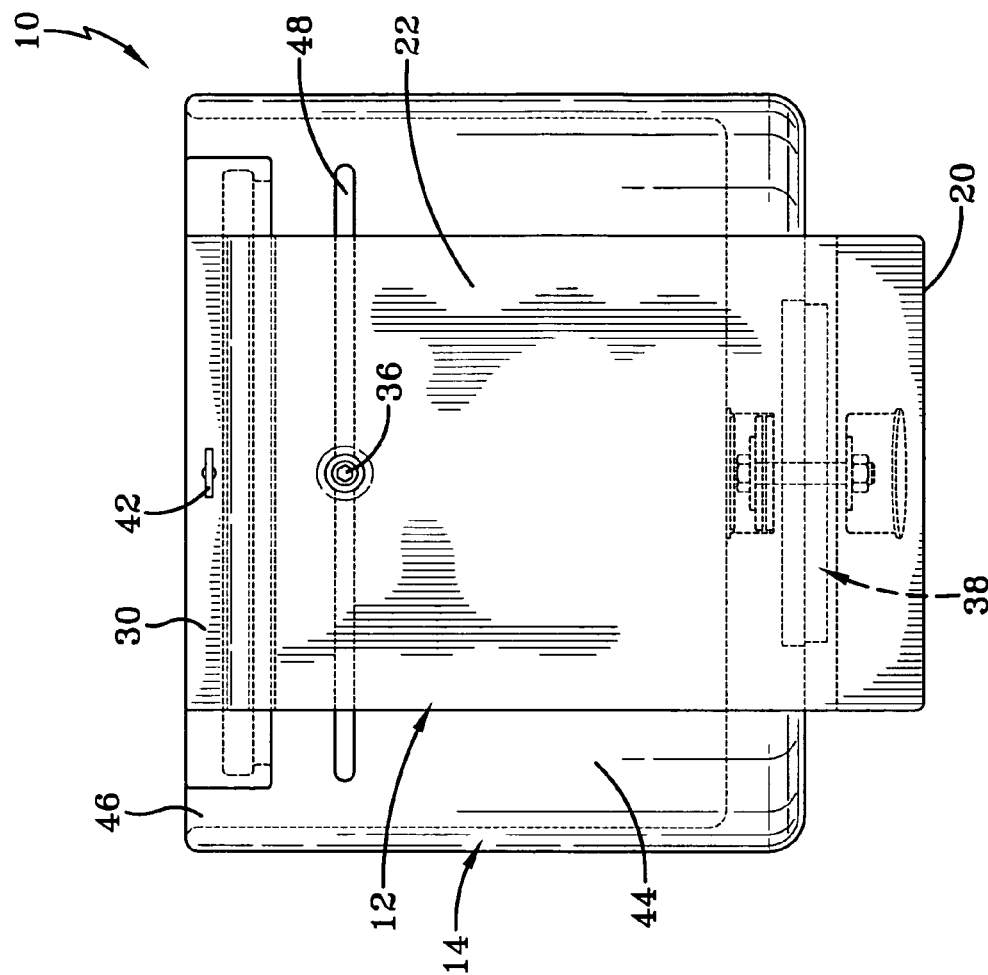
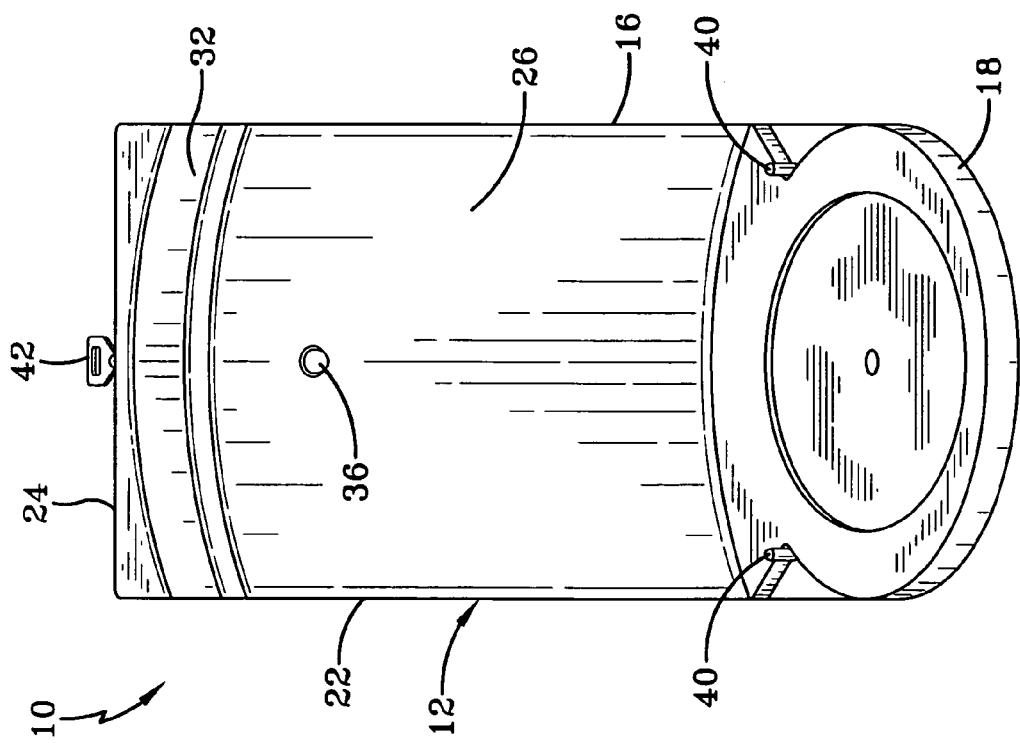

SWIVELABLE CAR SEAT

CROSS-REFERENCE TO RELATED APPLICATION

This application claims the benefit of U.S. Provisional Patent Application Ser. No. 60/657,951, filed on Mar. 2, 2005.

BACKGROUND OF THE INVENTION

1. Technical Field

The present invention relates to the art of removable seats for vehicles. More particularly, the invention relates to the art of removable safety seats used for children in vehicles. Still more particularly, the present invention is directed to a safety seat that selectively swivels between a forward-facing position and a side or door-facing position to enable a child enter and/or exit the seat.

2. Background Art

Safety seats in vehicles for children, also known in the art as car seats, are well-known in the art. Car seats are removable units that are secured to a selected passenger seat of a vehicle. Car seats are specially designed for the smaller weight and size of a child, as compared to standard vehicle seats, which are designed to accommodate large youths and adults. In most states, once a child reaches a certain weight and age, such as over 20 pounds and one year old, a car seat is used in which the child faces the front of the vehicle. Prior-art car seats that facilitate this forward-facing position typically are one-piece units that are placed on a selected one of the vehicle's passenger seats, and the vehicle's seatbelt for the selected passenger seat is passed through the frame of the child's car seat and latched to secure the car sear to the vehicle seat, as known in the art. In this manner, the car seat essentially sits on a pre-existing vehicle passenger seat and is secured thereto with a seatbelt.

Since such prior-art car seats are designed to secure a child and limit movement of the child, it can be difficult to move the child into or from such a seat. For example, a typical prior-art car seat includes partially raised sides, and a five-point seatbelt harness to secure the child to the car seat. The raised sides of a forward-facing seat, however, make it necessary for an adult that is assisting the child into the seat to lift the child over a side of the seat and then place the child in the seat. Due to the confined space in most passenger vehicles, the assisting adult must remain outside the vehicle when lifting and assisting the child, causing the adult to bend and lean or reach into the vehicle. Moreover, the assisting adult has to lean into the vehicle to assist the child in putting the five-point harness on and buckling it. When the child exits the vehicle, it is again necessary for the assisting adult to lean into the vehicle over the car seat, assist the child in unbuckling the five-point harness, and lift the child up and past a raised side of the car seat.

This structure of a typical prior-art car seat creates problems for both the child and the assisting adult. Particularly when a larger child is to use the seat, or when adults that are older or may have physical disabilities assist the child, it can be difficult to lift the child over the side of the car seat, as well as to lean into the vehicle to place the child in the seat and assist the child in buckling the harness. As a result, potential discomfort and/or injury may be incurred by the assisting adult. Moreover, the act of lifting the child over a raised side of the prior-art car seat may cause the assisting adult to inadvertently bump the child's head against the side or upper door frame of the vehicle, or even accidentally drop the child. Hence, prior-art forward-facing car seats may result in potential discomfort and/or injuries for both the assisting adult and the child using the seat.

Thus, a need exists in the art for an apparatus that allows a child to be placed into and removed from a car seat without the need for an assisting adult to substantially lean inside the vehicle, or to lift the child over a raised side of the car seat. The swivelable car seat of the present invention provides such an apparatus, selectively swiveling between a forward-facing position and a side or door-facing position to enable a child enter and/or exit the seat.

BRIEF SUMMARY OF THE INVENTION

An objective of the present invention is to provide a car seat for a child that enables the child to be placed into and removed from the seat without the need for an assisting adult to substantially lean inside the vehicle.

Another objective of the present invention is to provide a car seat for a child that enables the child to be placed into and removed from the seat without the need to lift the child over a raised side of the car seat.

These objectives and others are obtained by the swivelable car seat of the present invention, the general nature of which may be stated as including a base capable of being removably disposed on a selected motor vehicle seat. A seat unit is swivelably connected to said base. A locking assembly selectively extends between the base and the seat unit for selectively restricting the swiveling of the seat unit on the base.

BRIEF DESCRIPTION OF THE SEVERAL VIEWS OF THE DRAWINGS

The preferred embodiments of the invention, illustrative of the best mode in which applicants have contemplated applying the principles of the invention, are set forth in the following description and are shown in the drawings, and are particularly and distinctly pointed out and set forth in the appended claims.

FIG. 3 is an angled front perspective view of a base of the swivelable car seat shown in FIG. 2;

FIG. 4 is a rear perspective view of the swivelable car seat shown in FIG. 2;

Similar numerals refer to similar parts throughout the drawings.

DETAILED DESCRIPTION OF THE INVENTION

Figure 1:
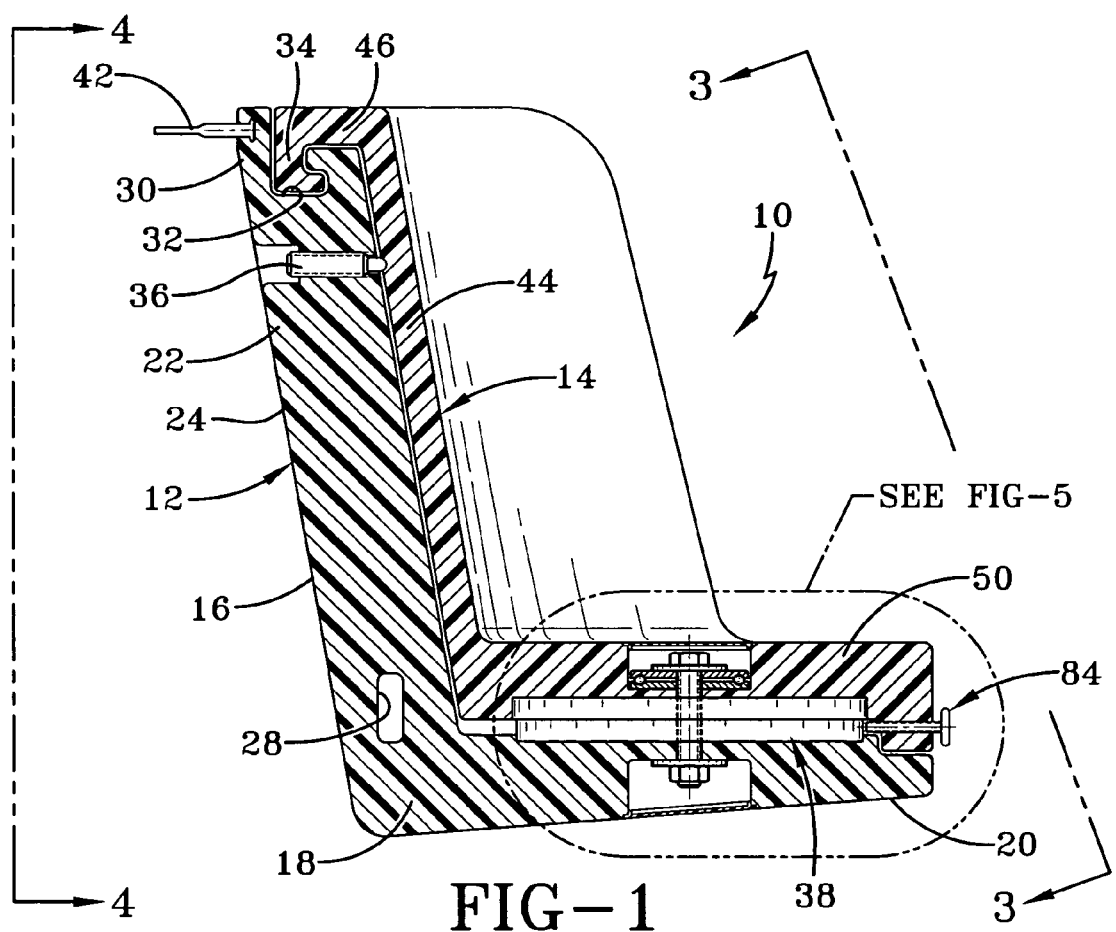
FIG. 1 is a cross-sectional view of a first embodiment of the swivelable car seat of the present invention, taken along line 1-1 in FIG. 2.
Figure 2:
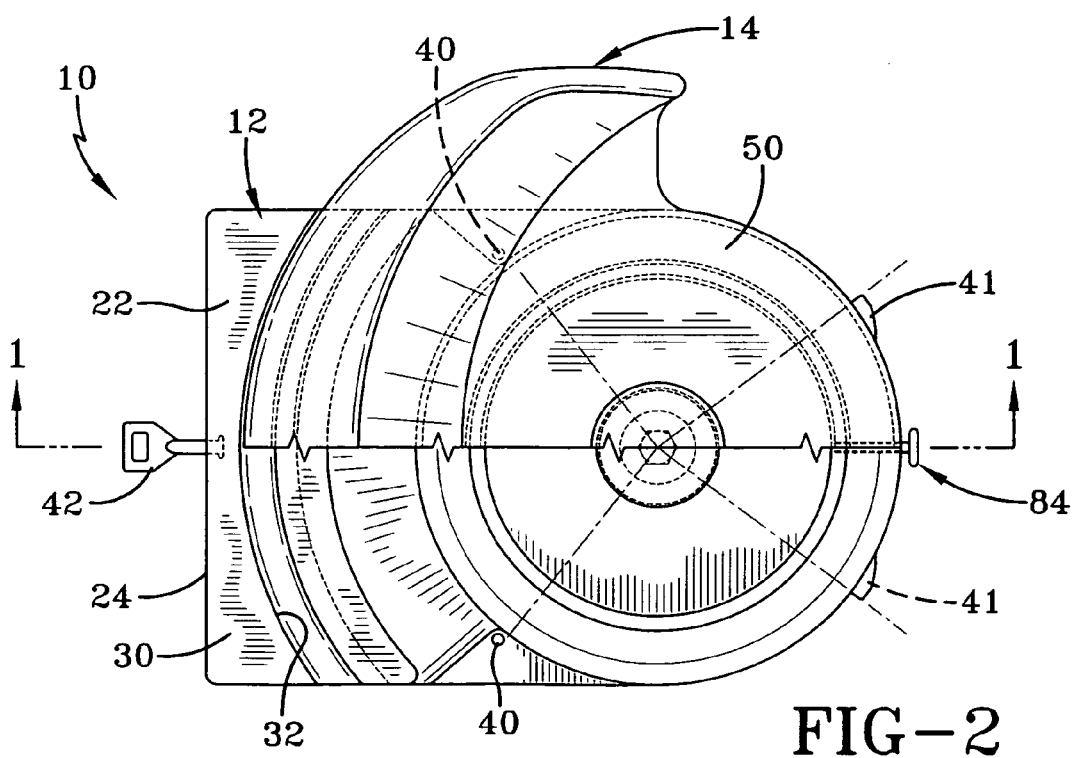
FIG. 2 is a fragmentary top plan view of the base unit and a portion of the seat unit of the swivelable car seat of the present invention, with hidden parts represented by dashed lines.

Turning now to the drawings of the present invention, wherein the illustrations are for showing preferred embodiments of the invention, and not for limiting the same, FIGS. 1-7 show a first embodiment of the swivelable car seat of the present invention, indicated generally at 10. With particular reference to FIGS. 1 and 2, swivelable car seat 10 includes a base 12 and a seat or seat unit 14. Base 12 pivotally engages and secures seat 14, as will be described in greater detail below.

Base 12 includes an L-shaped frame 16. Frame 16 in turn includes a horizontal bottom member 18 having a bottom surface 20 that is contoured to generally conform to the seat area of a typical passenger seat of a vehicle (not shown). Frame 16 also includes a vertical upper member 22 that has a rear surface 24 shaped to generally conform to the front of the seatback of the vehicle passenger seat. With additional reference to FIG. 3, vertical member 22 also includes a front surface 26 that preferably is curved to facilitate the swivel of seat 14. Mounted in vertical member 22 at front surface 26 preferably is at least one roller assembly 36 which contacts seat 14 and enables a consistent clearance to be maintained between the seat and base 12 as the seat swivels. Slots 28 are formed in frame 16 at the bottom of vertical member 22 at or near horizontal member 18, and enable the seatbelt of the vehicle (not shown) to pass through the base frame and secure it to the passenger seat in a manner known to those skilled in the art. Thus, base unit 12 enables a seatbelt of the vehicle to connect swivelable car seat 10 to a selected vehicle seat. Optionally, an upper anchor 42 may be attached to base 12 at a top 30 of vertical member 22, thereby providing an additional anchor for swivelable seat 10, as known in the art. At top 30 of vertical member 22 a groove 32 is formed in the vertical member to engage an upper hook 34 of seat 14, as will be described in greater detail below.

Seat 14 includes a vertical upper member 44 and a horizontal bottom member 50. With additional reference to FIG. 4, vertical member 44 may extend laterally up to about 270 degrees, that is, leaving only the forward-facing 90 degrees of seat 14 open, thereby surrounding the back and sides of a child sitting in swivelable seat 10, which provides safety advantages to be described below. As mentioned above, seat 14 includes upper hook 34 which is formed on or is attached to a top 46 of vertical member 44 and engages groove 32 of base 12 to prevent the base and the seat from separating in the event of an impact. The hook and groove sections 32, 34 allow seat 14 to swivel in relation to base 12, while remaining securely attached thereto. Vertical member 44 of seat 14 also includes a groove 48 that aligns with roller assembly 36 in base 12. As shown in FIG. 4, since vertical member 22 of base 12 does not extend about the sides of the child, as does vertical member 44 of seat 14, groove 48 and roller assembly 36 cooperate to enable the vertical base member and the vertical seat member to remain consistently aligned, with uniform clearance and spacing integrity therebetween. Seat 14 also includes padding, seat material and a five-point seat harness (not shown), which are known to those skilled in the art.

Facilitating the swivel of seat 14 in relation to base 12 is a turntable assembly 38, which is mounted to and extends between bottom member 18 of the base and bottom member 50 of the seat. To limit the rotation of seat 14, base 12 includes stops 40 which provide positive mechanical stops at predetermined side-facing positions, to be described below.

Figure 5:
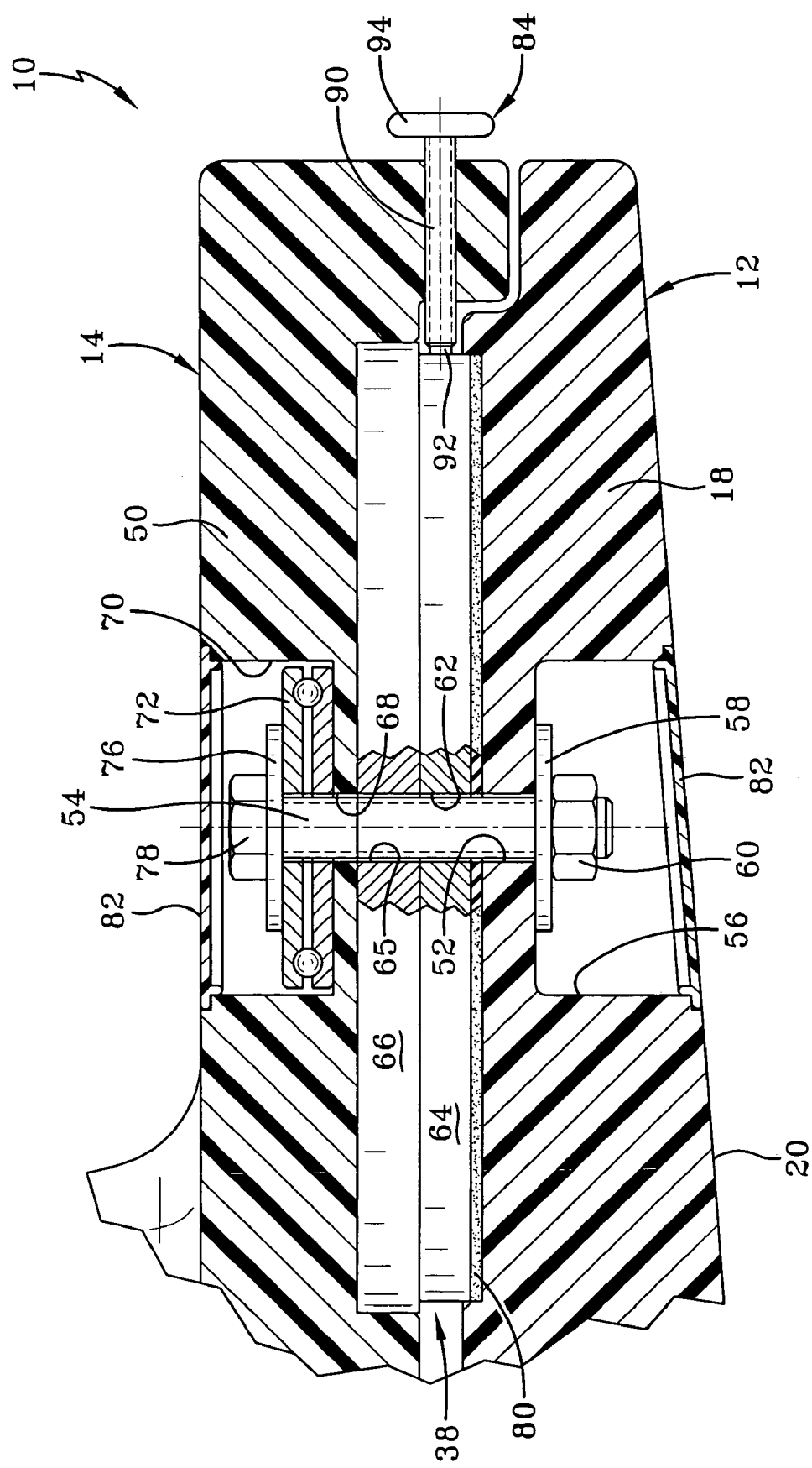
FIG. 5 is an enlarged fragmentary cross-sectional side view of a lower portion of the swivelable car seat shown in FIG. 1.

Turning now to FIG. 5, an exemplary construction for turntable 38 is shown. Bottom member 18 of base 12 defines a cylindrical orifice 52 through which a center bolt 54 passes. At bottom surface 20 of bottom member 18, a counter-sunk cavity 56 is formed in axial alignment with orifice 52. Cavity 56 enables fasteners, such as a washer 58 and a lock nut 60 to be secured to center bolt 54 inside base 12. Center bolt 54 extends upwardly through an aligned opening 62 formed in a lower turntable plate 64 and an aligned opening 65 formed in an upper turntable plate 66. Center bolt 54 then passes through an aligned opening 68 and into a counter-sunk cavity 70 formed in bottom member 50 of seat 14. Cavity 70 in seat 14 enables a roller bearing 72, a washer 76 and the head 78 of bolt 54 to be secured inside seat 14. In this manner, center bolt 54 is secured with nut 60, thereby securing seat 14, turntable plates 64, 66 and base 12 in pivotal alignment. Roller bearing 72 and upper turntable plate 66 cooperate to provide rotational surfaces that enable seat 14 to swivel in relation to base 12 and lower turntable plate 64. To reduce the tendency of base 12 to move when seat 14 swivels, a friction pad 80, or other means, such as mating dimples and indentations, are preferably included between bottom member 18 of base 12 and lower turntable plate 64.

Thus, center bolt 54 provides the axis about which seat unit 14 rotates, and also provides a means to secure the seat 14 to base 12. Bolt head 78 and lock nut 60 cooperate to keep seat bottom 50 and bottom member 18 of base 12 in compression, thereby providing a tight, stable connection between the base and seat 14, while still allowing rotation of the seat. Preferably, counter-sunk cavity 56 in base 12 and counter-sunk cavity 70 in seat 14 are covered by pop-in plugs 82 of plastic or elastomeric material.

Figure 6:
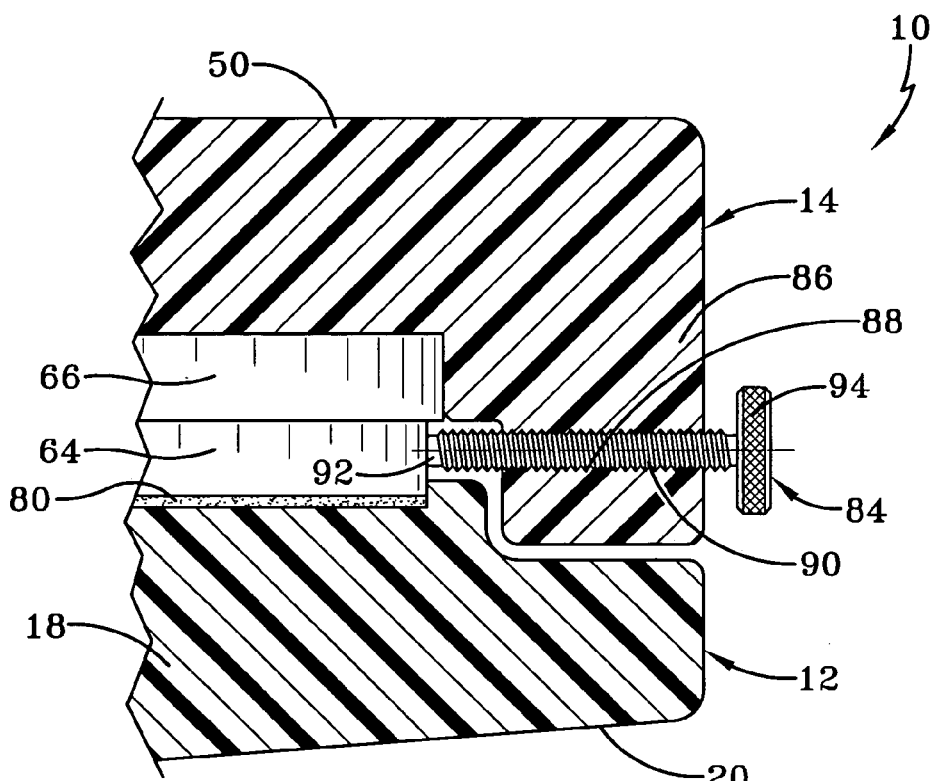
FIG. 6 is an enlarged fragmentary cross-sectional view of a portion of the swivelable car seat shown in FIG. 5, with a first exemplary locking assembly.
Figure 7:
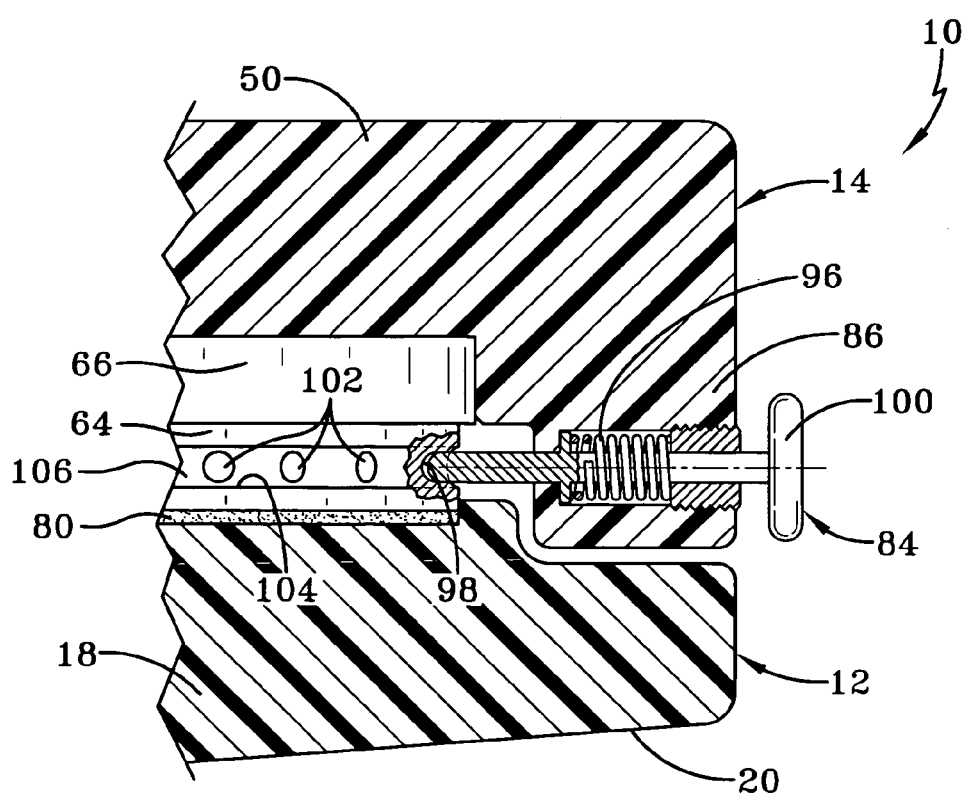
FIG. 7 is a view similar to FIG. 6, but with a second exemplary locking assembly.

Turning now to FIG. 6, to secure the position of swivelable seat 10, a locking assembly 84 is included. Bottom 50 of seat 14 includes a downwardly extending lip 86. A generally horizontal channel 88 is formed in lip 86 to allow a fastener 90, such as a pin, to pass through the lip to selectively secure seat 14 to a fixed point, such as turntable bottom plate 64 or bottom member 18 of base 12. Fastener 90 preferably is a threaded locking pin that passes through channel 88 and includes a tip 92 which frictionally engages lower turntable plate 64 or a portion of bottom member 18 of base unit 12 when a handle 94 is turned, thereby securing the position of seat 14 so that the seat does not rotate or swivel. Thus, when seat 14 is in a forward-facing position, a user may turn handle 94 of fastener 90 clockwise to secure fastener 90 against lower turntable plate 64 or base 12, and thus lock the seat in a forward-facing position. When it is desired to swivel seat 14 to a loading or unloading position, that is, to the right side or left side to face a vehicle door (not shown), the user turns the handle 94 counterclockwise to disengage the frictional connection between fastener 90 and lower turntable plate 64 or base 12. The seat 14 is then free to swivel on turntable assembly 38, reaching a limit of rotation when the seat faces the open door, as dictated by the engagement of a projection 41, which is formed on bottom member 50 of the seat, with a respective one of positive stops 40 formed on base 12. The user then turns handle 94 in a clockwise direction to re-engage tip 92 of fastener 90 with lower turntable plate 64 or base 12 to secure seat 14 in position and safely load or unload the child to or from the seat.

Once the child is seated in and secured to seat 14, handle 94 is rotated in a counterclockwise direction to enable the seat to rotate to a forward-facing position, at which time the user rotates handle 94 in a clockwise direction to secure fastener 90 to lower turntable plate 64 or base 12. Preferably, fastener 90 is in a center position of seat 14, that is, the fastener engages lower turntable plate 64 or base 12 at the front of the turntable plate or base, respectively, when a forward-facing position is reached. Alternatively, the position of fastener 90 in lip 86 of seat 14 may be configured off-center, that is, to allow the fastener to engage lower turntable plate 64 or base in a forward-facing position when the fastener aligns with a left front or right front portion of the turntable plate or base, thereby allowing easier use by an adult who leans into the vehicle door from outside the vehicle.

Other types of fasteners 90 that are known in the art may be used. For example, turning now to FIG. 7, a spring-loaded fastener 96 may be used. When spring-loaded fastener 96 is used, a corresponding orifice or indentation 98 is formed in bottom turntable plate 64 or base 12, enabling the spring-loaded fastener to engage the front orifice when seat unit 14 is in a forward-facing position. A user then pulls handle 100 to free seat 14 for rotation to a side-facing position for loading or unloading of the child. When spring-loaded fastener 96 reaches the side-facing position, the spring enables the fastener to engage a selected one of side orifices 102, which are positioned in a corresponding right- or left-facing side of lower turntable plate 64 of base 12. Once the child is seated and secured to seat 14, the user pulls handle 100 to disengage spring-loaded fastener 96 from the selected one of side orifices 102 and rotates the seat to a forward-facing position, whereupon the fastener engages front orifice 98. The spring-loaded nature of fastener 96 causes a positive snapping sound that is heard by the user when the fastener engages orifices 98, 102, thereby providing confirmation of the engagement of the fastener in the selected orifice. To guide fastener 96, a channel 104 may optionally be formed in base 12 or bottom turntable plate 64, and a guide ring 106 may be included in the channel to provide a smooth, hard surface on which a tip of the fastener rides. It is important to note that alternative designs may be employed for spring-loaded fastener 96, as known in the art.

Figure 8:
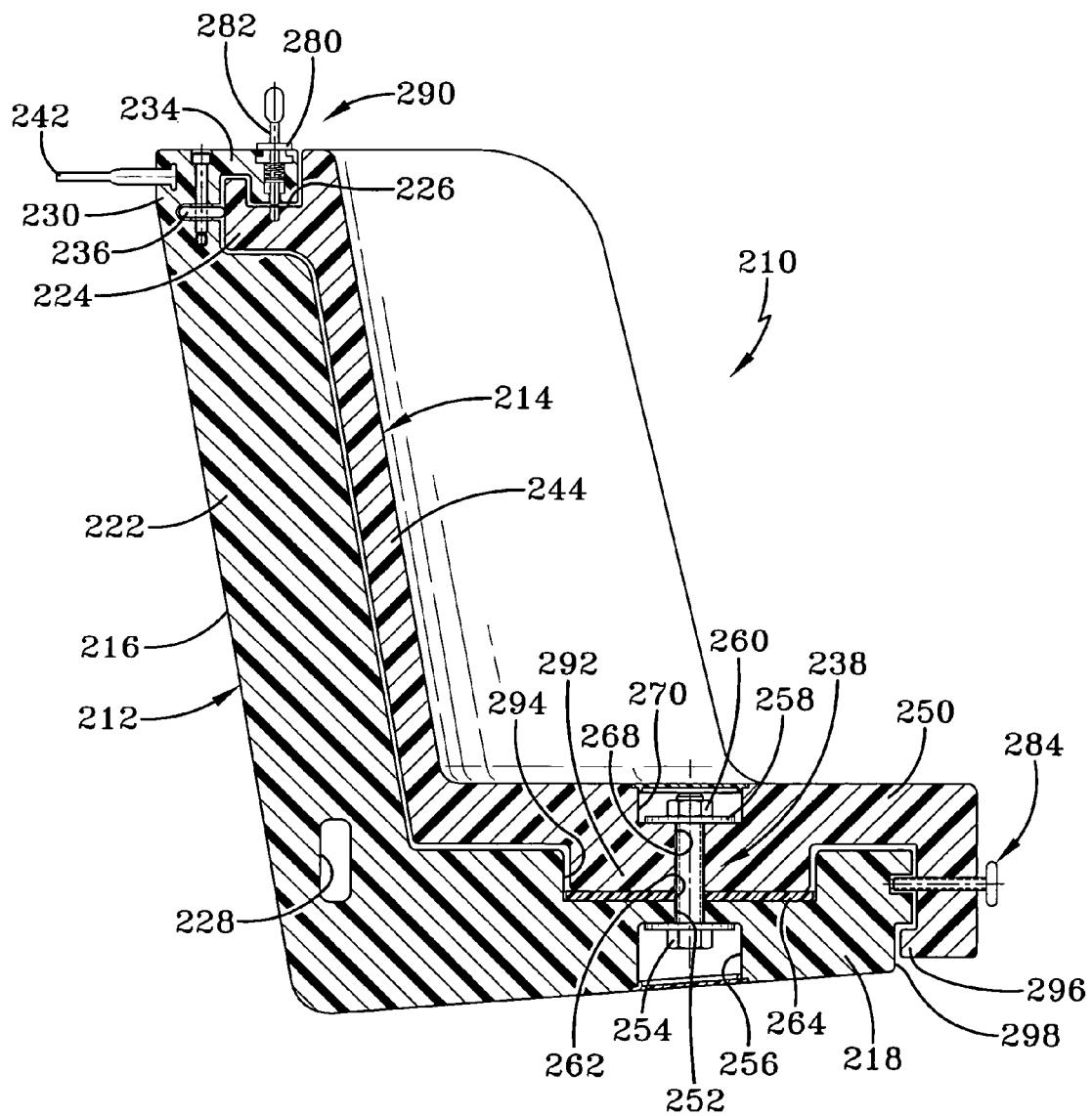
FIG. 8 is a side cross-sectional view of a second embodiment of the swivelable car seat of the present invention.

Turning now to FIG. 8, a second embodiment of the swivelable car seat of the present invention is shown generally at 210. For the purpose of convenience and clarity, the differences between second embodiment swivelable car seat 210 and first embodiment swivelable car seat 10 (FIG. 1) are described below. More specifically, second embodiment swivelable car seat 210 includes a base 212 having an L-shaped frame 216, which in turn includes a generally horizontal bottom member 218 and a vertical member 222. A top portion 230 of base vertical member 222 forms an upper hook 234. Second embodiment swivelable car seat 210 also includes a seat 214, which includes a top portion 224 having an interlocking structure, such as a channel 226, formed therein. In this manner, upper hook 234 of base 212 engages seat channel 226 to provide a positive mechanical connection between base vertical member 22 and seat upper portion 224. This connection also permits seat 214 to swivel in relation to base 210. Thus, upper hook 234 and channel 226 cooperate to maintain the integrity of second embodiment swivelable car seat 210 in the event of an impact.

Second embodiment car seat 210 preferably includes a vertically-disposed locking assembly 290, which is mounted in base vertical member 222 and selectively engages seat upper portion 226. Locking assembly 290, when engaged, generally prohibits seat 214 from swiveling relative to base 212 and thus secures the seat relative to the base. Preferably, second embodiment locking assembly 290 includes a pin 282 having an integral flange 280. Flange 280 is rectangular, and in an unlocked position, rests on top of base vertical member 222, thereby preventing pin 282 from extending into seat top 224, which enables seat 214 to swivel relative to base 212. When it is desired to engage or lock pin 282 in seat top 224 to prevent seat 214 from rotating relative to base 212, the pin is rotated 90 degrees. Due to the rectangular shape of flange 280, the flange is then able to pass through a narrow cavity formed in base vertical member 222, which enables pin 282 to engage seat top 224. Preferably, pin 282 is spring-loaded, so that flange 280 snaps into a positive locking position in a wider cavity once the pin has fully engaged seat top 224. When it is desired to unlock pin 282 to enable seat 214 to swivel, the pin is again turned 90 degrees, enabling flange 280 to pass out of the cavity in base vertical member 222 and onto the top of the base vertical member. In this manner, pin 282 provides a simple 90 degree turn-to-lock and turn-to-unlock mechanism having positive stops.

Alternatively, locking assembly 290 may generally be similar in construction and operation to above-described locking assembly 84, with the exception that vertically-disposed locking assembly 290 generally is vertical and secures seat upper portion 226 to base vertical member 222, rather than being generally horizontally disposed and securing seat bottom 50 to base bottom member 18. Also mounted in base vertical member 222 preferably is at least one roller assembly 36 which contacts seat 14 and enables a consistent clearance to be maintained between the seat and base 12 as the seat swivels.

Additionally, turntable assembly 238 of second embodiment swivelable car seat 210 is simplified over that of first embodiment swivelable car seat 10. More particularly, bottom member 218 of base 212 defines a cylindrical orifice 252 through which a center bolt 254 passes. A counter-sunk cavity 256 is formed in bottom member 218 in axial alignment with orifice 252. Cavity 256 enables installation of and access to center bolt 254 inside base 212. Center bolt 254 extends upwardly through an aligned opening 262 formed in a disk 264, through an aligned opening 268 formed in seat bottom member 250, and into a counter-sunk cavity 270 formed in the seat bottom member. Seat cavity 270 in seat 214 enables fasteners, such as a washer 258 and a lock nut 260 to be secured to center bolt 254 inside the seat.

In this manner, center bolt 254 is secured with nut 260, thereby securing seat 214, disk 264 and base 212 in pivotal alignment. Thus, center bolt 254 provides the axis about which seat 214 rotates, and also provides a means to secure the seat to base 212. To enable efficient rotation of seat 214 relative to base 212, disk 264 preferably is made from or coated with a low-friction material such as polytetrafluoroethylene.

Second embodiment swivelable car seat 210 further includes a circular protrusion 292 formed on a bottom member 250 of seat 214, which preferably forms part of turntable assembly 238, and which is received in a mating cavity 294 formed in base bottom member 218. The engagement of protrusion 292 in cavity 294 provides stability for the rotation of seat 214, and provides a positive mechanical engagement that reduces fore-aft and side-to-side movement of the seat. Seat 214 also includes a lower hook 296 formed on seat bottom member 250, which is received in a corresponding channel 298 that is formed in base bottom member 218. The engagement of lower hook 296 and channel 298 provides a positive mechanical engagement to limit vertical movement of seat 214 relative to base 212. The engagement of protrusion 292 and cavity 294, and the engagement of lower hook 296 and channel 298, each help to maintain the integrity of swivelable car seat 210 in the event of an impact, by acting to retain the connection between base 212 and seat 214.

An upper anchor 242 optionally is attached to base 212 at top portion 230 of vertical member 222, thereby providing an additional anchor for swivelable seat 210, as known in the art. An additional lower anchor (not shown) may also be attached to bottom member 218 of base 212, thereby providing yet another anchor for the swivelable seat 210, also as known in the art.

Swivelable car seat 10, 210 of the invention enables seat 14, 214 to rotate up to 90 degrees left or right from a forward-facing position so that the seat faces a vehicle door, thereby facilitating easier loading and unloading of the child. For example, when swivelable car seat 10, 210 is closest to a door on the left side of the vehicle, the car seat may selectively be swiveled to face the left door, and likewise, when the car seat is closest to a door on the right side of the vehicle, the car seat may selectively be swiveled to face the right door. Of course, swivelable car seat 10, 210 of the invention maintains a forward-facing position during vehicle operation.

By using fixed base 12, 212 and seat 14, 214, which swivels via a respective turntable assembly 38, 238, convenient and dependable rotation of swivelable car seat 10, 210 is established. Moreover, the use of groove 32 and upper hook 34, upper hook 234 and channel 226, protrusion 292 and cavity 294, and lower hook 296 and channel 298, each help to preserve the integrity of swivelable car seat 10, 210 in the event of an impact, retaining the connection between each respective base 12, 212 and seat 14, 214.

Seats 14, 214 of swivelable car seats 10, 210, respectively, surround the child to a greater extent than prior art seats, wrapping about the back and each side of the child up to about 270 degrees. That is, since seats 14, 214 swivel to face an open vehicle door frame for loading and unloading, it is only necessary to have an opening of approximately 90 degrees to allow the child to enter and exit the car seat, as well as for the child's legs to extend from the seat. Therefore, the sides of seats 14, 214 preferably substantially surround the child, and can be padded appropriately, which may provide greater side-impact protection for the child in the case of a vehicle accident. In this manner, swivelable car seats 10, 210 of the present invention provide greater protection than car seats of the prior art.

The features of swivelable car seat 10, 210 reduce the amount of strength required to assist a child in and out of the car seat, thus reducing the potential for injury to an adult who assists the child. Moreover, since there is a reduced need to lift the child into or out of swivelable car seats 10, 210, the likelihood of bumping of the child's head on the vehicle door frame is also reduced. These advantages are accomplished by enabling the adult who is assisting the child to gain better control of the child with a seat 14, 214 that is facing an open vehicle door for loading and unloading and then swiveling the seat to a forward-facing position for traveling, rather than being restricted to a forward-facing position.

In this manner, swivelable car seat 10, 210 of the present invention provides an apparatus that allows for easier assistance of a child entering and exiting the car seat, thereby reducing the tendency of injury to an adult who is assisting the child, as well as potentially reducing injuries to the child by reducing the lifting of the child that is required, as well as by surrounding the sides of the child to protect against side-impact.

It is important to note that other arrangements of components may be used without affecting the overall concept of the invention. For example, other forms for turntable assemblies 38, 238 may be used, as alternative construction of the rotation mechanism may be adopted to suit particular design requirements, thereby potentially altering or eliminating at least one of upper and lower turntable plates 64, 66 and roller bearing 72, or disk 264. It should also be noted that, while portions of car seat 10, 210 have been illustrated as solid sections, they may alternatively be adapted to be hollow for cost and weight savings without affecting the overall concept or operation of the invention.

Accordingly, the swivelable car seat of the present invention is simplified, provides an effective, safe, inexpensive, and efficient structure which achieves all the enumerated objectives, provides for eliminating difficulties encountered with prior-art car seats, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved swivelable car seat is constructed, arranged and used, the characteristics of the construction and arrangement, and the advantageous, new and useful results obtained; the new and useful steps, structures, devices, elements, arrangements, parts and combinations, are set forth in the appended claims.

What is claimed is:

1. A car seat for restraining a child during operation of a motor vehicle, comprising:
   a base capable of being removably disposed on a selected motor vehicle seat, said base including a groove formed in an upper portion thereof;
   a seat unit swivelably connected to said base, said seat unit including an upper hook that is received in said groove of said base; and
   a locking assembly selectively extending between said base and said seat unit for selectively restricting the swiveling of said seat unit on said base.

2. The car seat of claim 1, wherein said swivelable connection of said seat unit seat to said base is provided by a turntable assembly.

3. The car seat of claim 2, wherein said turntable assembly includes a central axis and a roller bearing.

4. The car seat of claim 2, wherein said turntable assembly includes a central axis and a disk with low-friction material.

5. The car seal of claim 1, wherein said seat unit selectively swivels on said base from a forward-facing position to a selected vehicle door opening.

6. The car seat of claim 1, wherein said locking assembly includes a pin attached to said seat unit capable of removably engaging said base.

7. The car seat of claim 1, wherein said locking assembly includes a pin attached to said base capable of removably engaging said seat unit.

8. The car seat of claim 1, wherein said seat unit substantially surrounds an occupant of the seat unit.

9. The car seat of claim 8, wherein said seat unit surrounds an occupant of the seat unit at least 180 degrees.

10. The car seat of claim 8, wherein side walls of said seat unit include protective padding.

11. The car seat of claim 1, wherein said base includes a channel formed in a lower portion thereof, and said seat unit includes a lower hook that is received in said channel.

12. A car seat for restraining a child during operation of a motor vehicle, comprising:

a base capable of being removably disposed on a selected motor vehicle seat, said base including a hook formed in an upper portion thereof;

a seat unit swivelably connected to said base by means of a turntable, said seat unit including a channel formed in an upper portion thereof for receiving said hook formed in said base; and a locking assembly selectively extending between said base and said seat unit for selectively restricting the swiveling of said seat unit on said base.

* * * * *